G. LILLIBRIDGE.
Canister.

No. 8,500. Reissued Nov. 19, 1878.

Witnesses:
Edw. W. Donn
R. F. Barnes.

Inventor:
George Lillibridge
per Milo Harris
Atty.

N. PETERS, PHOTO-LITHOGRAPHER, WASHINGTON, D. C.

UNITED STATES PATENT OFFICE.

GEORGE LILLIBRIDGE, OF JAMESTOWN, NEW YORK.

IMPROVEMENT IN CANISTERS.

Specification forming part of Letters Patent No. 147,661, dated February 17, 1874; Reissue No. 8,500, dated November 19, 1878; application filed November 11, 1878.

*To all whom it may concern:*

Be it known that I, GEORGE LILLIBRIDGE, of Jamestown, in the county of Chautauqua and State of New York, have invented certain new and useful Improvements in Chests for Teas, Coffees, &c.; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The object of my invention is to provide a cheap and secure receptacle for tea, coffee, &c., and one that is not only more convenient for use, but one in which the contents are less exposed to the air while being removed; and consists in an outward projection or trough provided with a suitable opening for the removal of its contents, also a vertical slide and an inclined false bottom, as will be hereinafter more fully set forth.

In that class of chests for tea, coffee, &c., having a base delivery it has heretofore been the custom to have the opening for delivery inwardly, or inside a vertical line of the sides of the chest or can, and this is found objectionable, as it is more costly, lessens greatly the capacity of the chest, and is not as convenient as where my improvements are used, as will be readily understood by the accompanying description and drawings, in which drawings—

Figure 1:
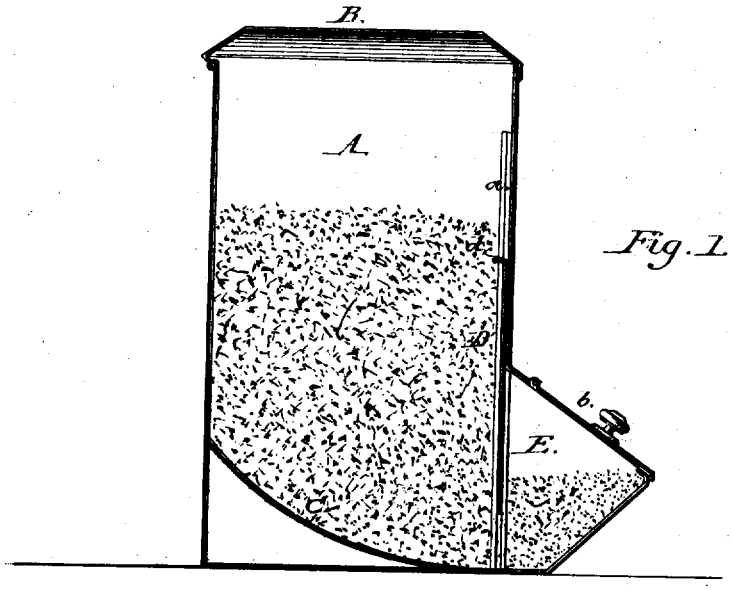
Figure 2:
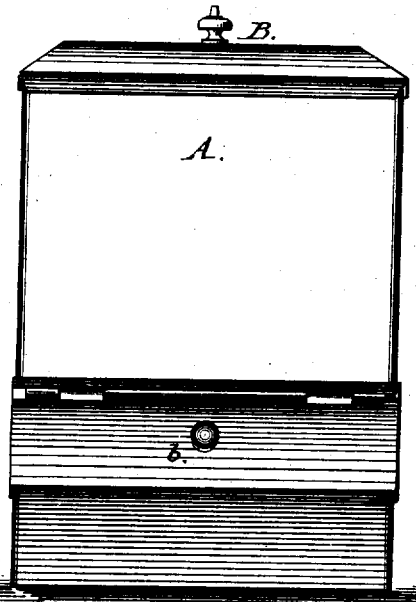

Figure 1 is a vertical section, showing my invention, and Fig. 2 is a front elevation of the same.

The chest A is made of suitable material, and may be square or other desired form, having suitable cover B. One wall or side of the chest is made to project outwardly near its base, forming a receptacle or trough, E, provided with a hinged cover, *b*.

C is a false bottom, which is concave or inclined toward the trough. D is a vertical plate extending the entire length of the trough E, and is arranged to slide in guides *a* at each end, as will be readily understood by the drawings. The lower edge of plate D is cut away, so that space may exist between said edge and the bottom of the chest, the object being to have a small quantity fed into the trough or till without having to raise the plate D when used for family purposes.

The plate or slide D may be raised by the projection or other convenient devices.

The till or trough E forms a good receptacle for scoop and what is left after weighing each time.

The false bottom C is made to incline toward the trough, so as to insure a full supply at the mouth till contents are exhausted, and this trough can be kept filled to any desired height.

Having described my invention, I claim—

1. A chest for tea, coffee, &c., having an outward projection or trough near its base, provided with an opening for the removal of its contents, substantially as set forth and described.

2. The vertical slide or plate D, in combination with chest A, having an outward projection or trough near its base, provided with an opening for the removal of its contents, substantially as set forth and described.

3. The inclined false bottom C, in combination with chest A, having an outward projection or trough near its base, provided with an opening for the removal of its contents, substantially as set forth and described.

In testimony that I claim the foregoing I have hereunto set my hand this 5th day of November, 1878.

GEORGE LILLIBRIDGE.

Witnesses:

W. W. WILSON,

MILO HARRIS.